United States Patent [19]

Linder

[11] 4,375,306
[45] Mar. 1, 1983

[54] CABINET AND TABLE UNIT FOR A VEHICLE

[76] Inventor: Charles L. Linder, 801 Spruce St., Hoquiam, Wash. 98550

[21] Appl. No.: 244,213

[22] Filed: Mar. 16, 1981

[51] Int. Cl.³ .............................. A47B 53/00; B60P 1/64
[52] U.S. Cl. ........................................ 312/250; 312/201; 312/254; 312/274; 108/44; 296/26; 414/522
[58] Field of Search ....... 312/250, 242, 254, DIG. 33, 312/201, 202, 274; 296/156, 26, 37.1; 108/44; 414/522

[56] References Cited

U.S. PATENT DOCUMENTS

| | | | |
|---|---|---|---|
| 107,398 | 9/1870 | Mooney | 312/284 |
| 129,612 | 7/1872 | Steinhauser | 312/201 |
| 344,132 | 6/1886 | Palmer | 312/250 |
| 1,109,734 | 8/1914 | Bauer . | |
| 1,440,484 | 1/1923 | Mooney | 312/274 |
| 2,044,661 | 6/1936 | Bentz | 312/DIG. 33 |
| 2,251,753 | 8/1941 | Newton | 312/DIG. 33 |
| 2,545,269 | 3/1951 | Ford | 312/337 |
| 2,643,395 | 6/1953 | Stassinos | 296/26 |
| 2,729,499 | 1/1956 | Eggum | 296/26 |
| 2,784,027 | 3/1957 | Temp | 296/26 |
| 2,797,828 | 7/1957 | Fritsche | 214/83.24 |
| 2,867,471 | 1/1959 | Coon, Jr. | 296/23 |
| 2,870,459 | 1/1959 | Babielski | 312/201 |
| 3,006,487 | 10/1961 | Gelli | 414/522 |
| 3,165,367 | 1/1965 | Rose | 312/250 |
| 3,726,422 | 4/1973 | Zelin | 414/522 |
| 3,888,539 | 6/1975 | Niessner | 296/23 |
| 3,896,742 | 7/1975 | Ferraro | 108/44 |
| 3,934,924 | 1/1976 | Diliberti | 108/44 |
| 4,002,385 | 1/1977 | Hone | 312/348 |
| 4,305,695 | 12/1981 | Zachrich | 414/522 |

FOREIGN PATENT DOCUMENTS 2659589 12/1976 Fed. Rep. of Germany ... 312/DIG. 33

Primary Examiner—Victor N. Sakran
Attorney, Agent, or Firm—Delbert J. Barnard; Eugene O. Heberer; Joan H. Pauly

[57] ABSTRACT

An elongated plywood panel serves as a base member for storage cabinets mounted onto the forward or inner end of the base member. The rearward or outer end portion of such base member functions as a table. A track structure is provided below the base member and supports the unit for sliding movement between a stowed position within the bed space of a pickup or the like and an extended or use position in which the table projects rearwardly from the bed space of the vehicle. The cabinets may include a pair of side cabinets which are hinge connected to a central cabinet, for movement between a storage position in which the side cabinets are in juxta-position with each other and the central cabinet and are positioned over the table, and a use position in which the side cabinets extend laterally outwardly, in a wing fashion, from the opposite sides of the table and from the access opening for the central cabinet. A fourth cabinet may be provided endwise of the central cabinet at the innermost end portion of the base. Such inner cabinet may include a side door access which is reachable from outside of the vehicle when the unit is in its use position and the side cabinet on that side of the vehicle has been swung inwardly into its position over the table. A support leg may be provided at the rear most end of the table. Such leg may be foldable into a storage position up against the under surface of the table.

8 Claims, 7 Drawing Figures

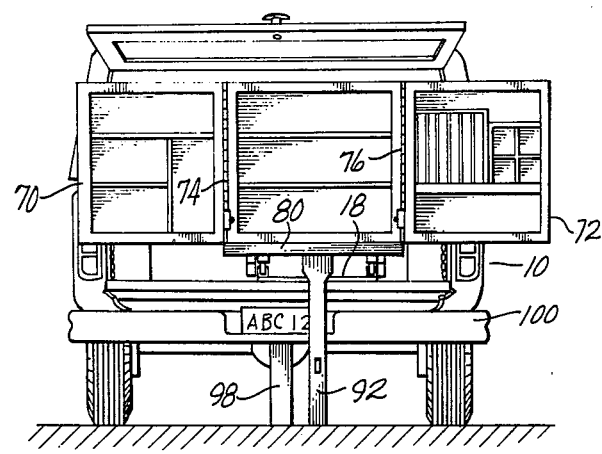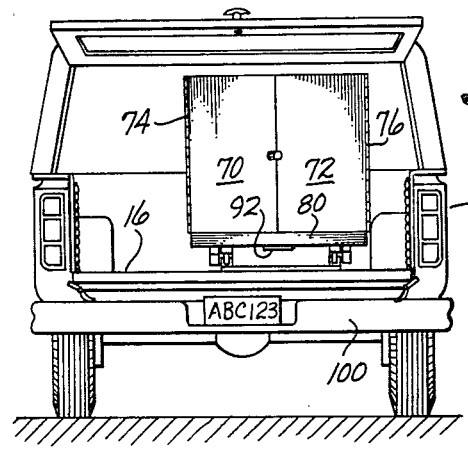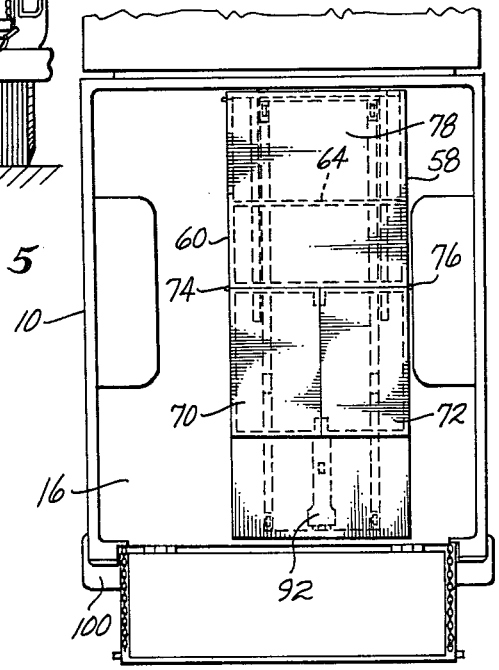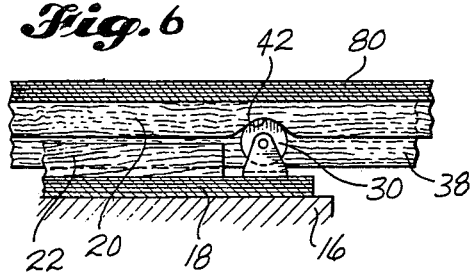

CABINET AND TABLE UNIT FOR A VEHICLE

DESCRIPTION

1. Technical Field

This invention relates to a cabinet and table unit which is adapted to be carried by a vehicle such as a pickup truck, a van or a station wagon.

2. Background Art

Recreational vehicles such as motor homes and camper unit carrying trucks have been popular for several years. However, such vehicles are very expensive to purchase and use. One attraction of using recreational vehicles for use camping, as opposed to camping without such vehicles, such as in tents or out in the open, is that the vehicles include storage cabinets in which food and kitchen utensils can be stored in an organized fashion.

It is known to provide a storage unit for camping use, which is adapted to be carried in a storage compartment of a vehicle. For example, U.S. Pat. No. 2,867,471, granted Jan. 6, 1959, to Alan B. Coon, Jr., discloses a collapsible storage unit that is adapted to fit into the rear end compartment of a station wagon.

Other vehicle carried storage cabinets or carriers are disclosed by the following U.S. Pat. Nos. 1,109,734, granted Sept. 8, 1914, to Harvey W. Bauer; 2,729,499, granted Jan. 3, 1956, to Murnat O. Eggum; 2,784,027, granted Mar. 5, 1957, to Conrad R. Temp; 2,797,828, granted July 2, 1957, to James E. Fritsche; 2,867,471, granted Jan. 6, 1959, to Allen B. Coon, Jr.; 3,726,422, granted Apr. 10, 1973, to Albert R. Zelin; and 3,888,539, granted June 10, 1975, to Robert A. Niessner.

The above described patents, together with the prior art that was cited and considered by the Patent Office before granting them, as listed on such patents, should be carefully considered for the purpose of properly evaluating the subject invention and putting it into proper perspective relative to the prior art.

DISCLOSURE OF THE INVENTION

The present invention relates to a combination cabinet and table unit which is adapted for installation within a storage compartment of a vehicle, e.g. the bed space of a pickup truck. Such unit comprises a base which is slidable into and outfrom the vehicle. A cabinet means is mounted onto a first or inner end portion of the base. The second or outer end portion of the base functions as a table.

Preferably, the cabinet means comprises a first cabinet having an access opening which faces outwardly from the vehicle, i.e. towards the second or outer end portion of the base. Preferably also, a second cabinet is hinge connected to the first cabinet and is movable between a first position, wherein it is positioned over the second end portion of the base, and a second position in which it is positioned laterally outwardly from the second end portion of the base.

In an embodiment of this type the second cabinet has an access opening which faces the same direction as the access opening of the first cabinet when the second cabinet is in its second position. The second cabinet is in its first position when the unit is in a stowed position within the storage compartment of the vehicle. When such unit is moved outwardly into its use position, the second cabinet is in its second position and the access openings for both cabinets are both located generally at the opening into the storage compartment of the vehicle, in easy reach of the user. Also, the second end portion of the base projects outwardly from the vehicle to serve as a table.

According to an aspect of the invention, the unit also comprises a third cabinet which is also hinge connected to the first cabinet. Preferably, the second and third cabinets are hinge connected to the corner portions of the first cabinet which are directed outwardly from the vehicle. When the second and third cabinets are in their first or stowed positions, their access openings face each other and the second and third cabinets are positioned over the second portion of the base. When the unit has been moved outwardly from the vehicle, and the second and third cabinets have been swung into their second or use positions, they extend laterally outwardly from each other on opposite sides of the base, like wings, and their access openings are directed in the same direction as the access opening for the first cabinet. The second end portion of the base functions as a table and projects outwardly from the first cabinet, between the second and third cabinets. The interiors of all three cabinets are thus conveniently in reach of a party sitting at or working around the table.

According to another aspect of the invention, a fourth or inner compartment is provided inwardly of the vehicle from the first compartment. In other words, it is situated on the base endwise from the first compartment in the direction opposite the direction that the table extends form the first cabinet. The first and fourth cabinets may be sections of a single structure. The fourth cabinet may be provided with a side located access opening which can be conveniently reached from outside the vehicle by the user merely swinging the second cabinet from its second or use position into its first or storage position, to provide an avenue between a side boundary of the opening into the vehicle and the side of the unit.

According to another important aspect of the invention, the combination cabinet and table unit is adapted for sliding movement between its retracted and use positions by means of a slide mechanism which also establishes the proper height of the table above the ground.

These and other objects, advantages and features of the invention will be apparent from the following description of a preferred embodiment of the invention.

BRIEF DESCRIPTION OF THE DRAWINGS

In the drawings, like element designations refer to like parts throughout, and:

FIG. 3 is an elevational view of the assembly shown by FIG. 1, looking directly toward the rear end of the vehicle;

FIG. 4 is a view like FIG. 3, but showing the cabinet-table unit closed and moved into a stowed position within the vehicle;

FIG. 5 is a view like FIG. 2, but showing the unit in its stowed position; and

FIG. 6 is a fragmentary side elevational view in the region of a rear base roller, showing the roller received with an upper rail recess when the unit is extended.

FIG. 7 is a pictorial view showing the guide rails and casters on the underside of the base in a spaced relationship with a track sturcture that is adapted to be secured to the bed of a vehicle.

BEST MODE FOR CARRYING OUT THE INVENTION

Figure 1:
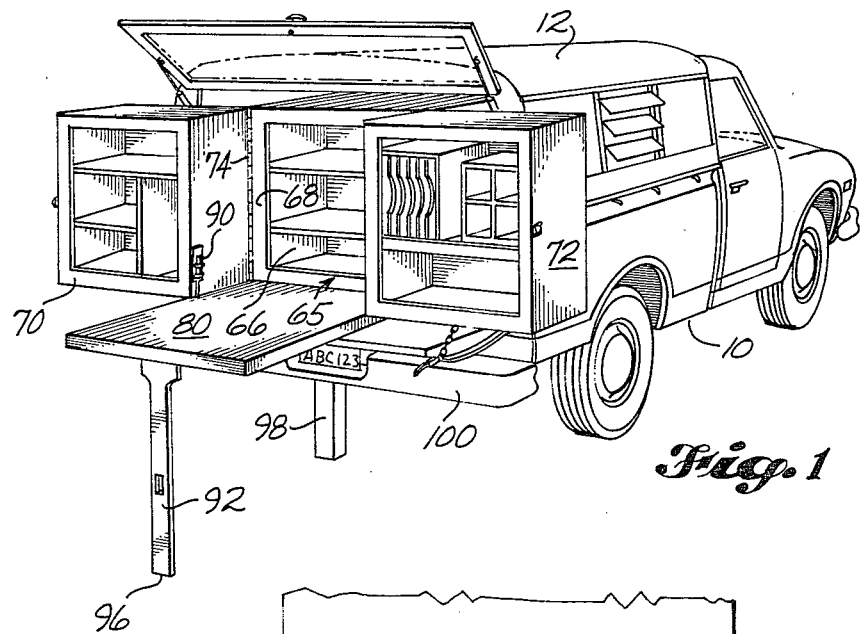
FIG. 1 is a pictorial view taken from above and looking towards the rear and one side of a canopy carrying pickup truck equipped with an embodiment of the present invention, such in its operative position.

By way of typical and therefore nonlimitive example, the illustrated form of cabinet and table unit is especially adapted for use by outdoorsmen such as campers, hunters, fishermen, picnickers, etc.

It is adapted for movement between a stowed position within the bed region of a pickup truck 10 which includes a canopy 12 and a use position in which the rear portion of the unit projects rearwardly from the rear end of the vehicle 10.

In preferred form, a track structure 14 is bolted or otherwise secured to the pickup bed 16. Track structure 14 may comprise a base board 18 cut from a sheet of three-fourth inch plywood, for example, and a pair of rails 20, 22 which are secured to the opposite edge portions of the base 18. By way of typical and therefore nonlimitive example, in a given installation, involving a relatively small pickup bed, the width of the base board 18 may be about sixteen and five-eighth inches and the rails 20, 22 may measure one and one-half inches wide by one and three-fourth inches high, measured from the upper surface of the plywood base board 18.

The cabinet and table unit comprises a base 24 which also may be a piece of three fourths inch plywood. A pair of rails 26, 28 are secured to the lower side of base 24 and are spaced apart the same distance as rails 20, 22. By way of typical and therefore nonlimitive example, rails 26, 28 may also have a depth of about one and three-fourths inches. In preferred form, a pair of two inch diameter casters 30, 32 are positioned endwise of rails 20, 22 at the rearward or outer end of baseboard 18. Similarly, a pair of two inch diameter casters 34, 36 are positioned endwise of rails 26, 28 at the forward or inner end of base member 24.

When base member 24 is positioned on track structure 14 the rails 20, 22 ride on casters 34, 36 and the rails 26, 28 ride on casters 30, 32.

A pair of side boards 38, 40 are secured to base member 24 immediately outwardly of the forward portions of rails 26, 28. By way of typical and therefore nonlimitive example, side boards 38, 40 may measure about thirty-three inches long by about three and one half inches deep, measured from the lower surface of base member 24. Side boards 38, 40 serve as guides for maintaining the rails 26, 28 positioned above the rails 20, 22.

Shallow cutouts 42, 44 may be formed in rails 26, 28, e.g. at a location measuring about fifteen and three-fourths inches from the inboard ends of rails 26, 28 to the centers of the cutouts 42, 44. These cutouts 42, 44 are deep enough to receive the upstanding portions of casters 30, 32. Since the casters 30, 32 measure two inches in diameter, they will project upwardly above the upper surfaces of rails 20, 22 about one quarter of an inch. The depressions 42, 44 should be slightly deeper than one fourth inch so that the lower surfaces of rails 26, 28 will directly contact the upper surfaces of rails 20, 22 when the casters 30, 32 are within the recesses 42, 44.

The above described track and caster structures constitute a means by which the base member 24 and the cabinet supported on it can be slid into and outfrom the vehicle storage space. When the base member 24 is moved all the way in (i.e. the cabinet and table unit is in its fully retracted or stored position) the casters 30, 32 are positioned in the spaces 46, 48 provided endwise rearwardly of the rails 26, 28. The forward casters 34, 36 are still positioned on the inner end portions of rails 20, 22. However, the rearward surface portions of rails 20, 22 make frictional contact with the rearward portions of the bottom surfaces of rails 26, 28. By virtue of this arrangement, the cabinet and table unit is not likely to slide rearwardly on its own. However, the frictional force can be easily overcome by a light pull on the rear end of base member 24. As soon as the base member 24 has been pulled rearwardly enough to move the bottom surfaces of rails 26, 28 up on to the casters 30, 32, the entire cabinet and table unit will be resting on casters and can be quite easily withdrawn until the casters 30, 32 enter the cutouts 42, 44. When this happens the unit is properly positioned in its use position.

Track structure 14 can be easily attached to the floor of the truck bed. By way of typical and therefor nonlimitive example, a single bolt 50 may be used to secure the rear end portion of baseboard 18 to the truck bed. A single bolt may also be used at the forward end of baseboard 18. Or, if preferred, an L shaped clete or the like (e.g. a length of angle iron) may be used, with one leg connected to the forward wall of the truck bed and the other leg resting on the baseboard 18.

Figure 2:
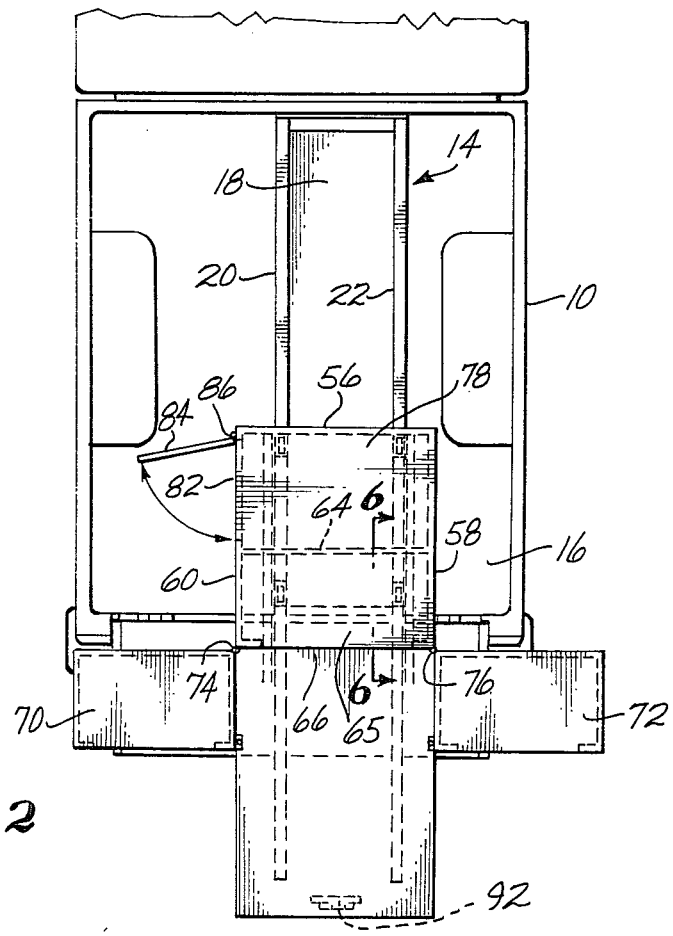
FIG. 2 is a top plan view of the assembly shown by FIG. 1, but with the canopy removed and the forward portion of the truck cut away.
Figure 8:
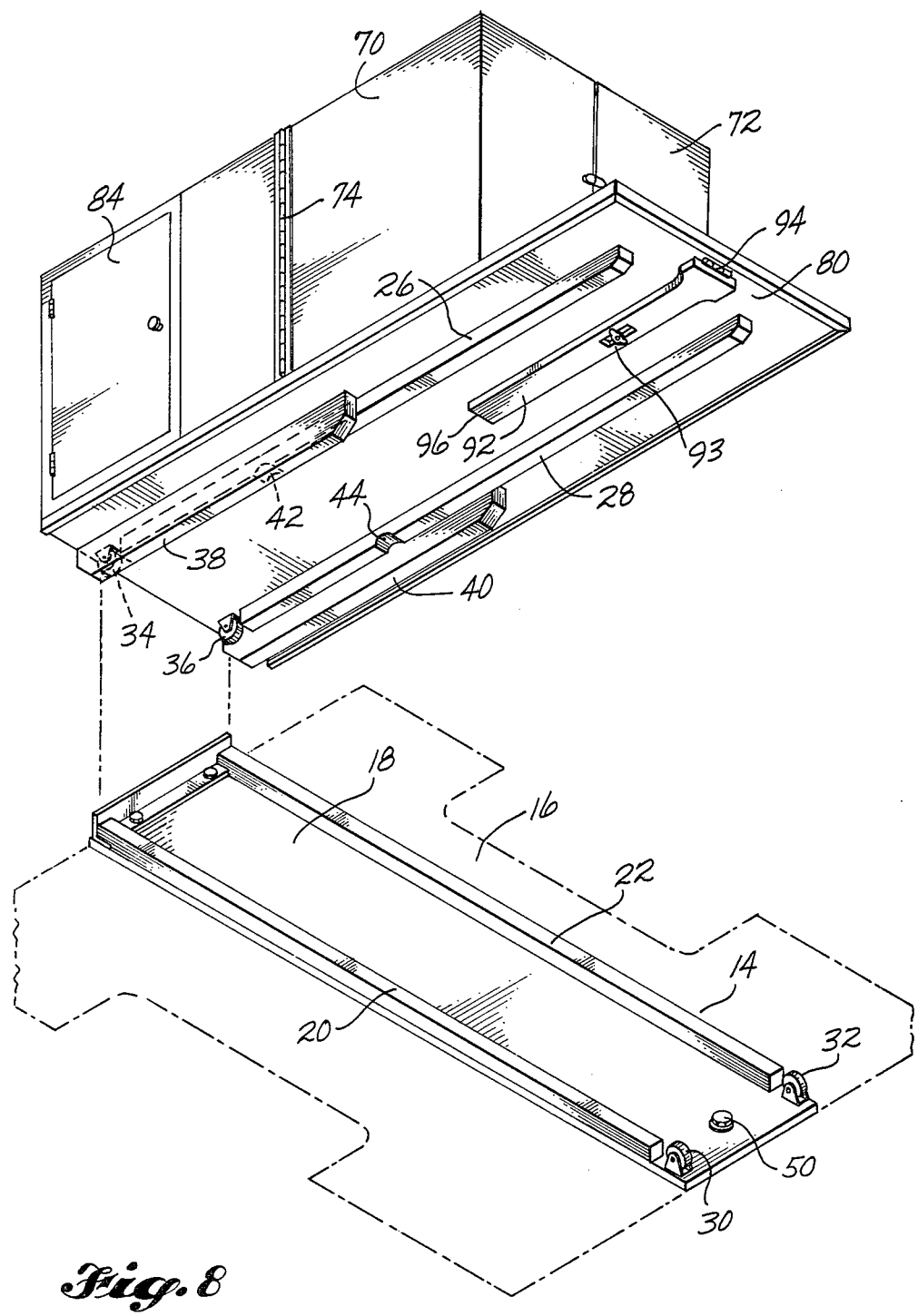

According to the invention, the forward portion of base member 24 supports a fixed cabinet structure. In the illustrated embodiment, this fixed cabinet structure has two compartments or sections. As shown by FIGS. 2 and 5, this cabinet structure comprises a front wall 56, side walls 58, 60, a top wall 62, and an inside wall 64 which divides such structure into its two sections. The first section is herein referred to as the first cabinet. It includes a rearwardly directed access opening 66. Opening 66 may be bordered by two inch trim boards 68.

The unit also includes a second cabinet 70 and a third cabinet 72. These cabinets are basically alike (with the possible exception of the way that they are internally partitioned) and are preferably equal in size. As shown by FIGS. 1-5, cabinet 70 is hinge connected to one of the rear corners of the first cabinet and the the third cabinet 72 is hinge connected to the opposite rear corner of the first cabinet. The hinges 74, 76 may be heavy duty piano hinges, for example, so that they can carry the weight of the cabinets 70, 72 when they are loaded and hanging in space on the hinges.

The cabinets 70, 72 may comprise horizontal and vertical panels of plywood secured together in the manner illustrated, with an access opening that is rearwardly directed when the cabinets 70, 72 are positioned in a manner illustrated by FIGS. 1-3. As shown by FIG. 5, the depth dimension of each cabinet 70, 72 is substantially one half of the width dimension of the base 24. As a result, the cabinets 70, 72 can be swung together into a position over the rear section of the base 24 (FIG. 5). When cabinets 70, 72 are in this position, their access openings are directed towards each other and each cabinet 70, 72 constitutes a closure for the other. At the same time, the two cabinets 70, 72 function as a closure for the access opening 66 of the first cabinet.

A fourth or inner cabinet 78 is preferably provided on base 24 endwise of the first cabinet in the opposite direction from the end portion 80 of base 24. This cabinet 78 may include a side access opening 82 provided with a swinging door 84 which is hinge connected at 86 to a forward corner portion of cabinet 78.

As shown by FIGS. 3 and 4, when such a cabinet 78 is provided, the track structure may be offset towards the side of the vehicle opposite the door 84, to provide extra room on the door side of the unit. When cabinet 70 is swung into its closed position (FIGS. 4 and 5) the user can easily reach door 84 and the interior of cabinet 78 from a position to the immediate rear of the vehicle. P The second or rearward end portion 80 of the base member 24 functions as a table. As shown by FIG. 1, it projects rearwardly from the first cabinet, between the second and third cabinets. As also shown by FIGS. 1-3, the interiors of all three cabinets 65, 70, 72 are easily accessible to a person sitting at or working around the table 80.

Preferably, the second and third cabinets 70, 72 are provided with some sort of mechanism for locking them into their open positions. Such a lock may take the form of a simple slide bolt mechanism 90 which is mounted onto the cabinet side wall which is adjacent the table 80. The slide bolt mechanism 90 may be so dimensioned and positioned that when its lock bolt is retracted the mechanism 90 will be aligned with a between shelves space within cabinet 65. And, when the lock bolt is extended, it will enter into a socket that is formed in or carried by the table 80. When the bolt is within the socket, the cabinet 70 (or 72) is prevented from rotating in position about the axis of its hinge 74 (or 76). Of course, other types of lock mechanisms may be used to perform this locking function.

Preferably, table 80 is provided with a support leg means which in the illustrated embodiment is shown to comprise a single support leg 92. Leg 92 may be hinge connected (e.g. at 94, in FIG. 5) to an under portion of the table 80, for movement between a stowed position up against the under side of table 80 and an operable position in which it projects downwardly from table 80. The second or lower end 96 of support leg 92 makes contact with the ground when the leg 92 is its operable position.

In some installations it may be desirable to make leg 92 extendable in length. Also, a pair of spaced apart legs might be used in place of a single leg. The leg means may be provided with a lock mechanism of some sort for locking it in its down position. It also may be provided with a lock mechanism for locking in its stored position. Also, in some installations, it may be desirable to use a detachable support leg means. That is, when the leg is not being used it is detached from the table, but in use is attached to the table and depends downwardly from it into a ground contacting support position.

In FIGS. 1 and 2 a block of wood 98 is shown between the ground and a lower portion of the vehicle bumper 100. It may be desirable to use such a block 98 to stabilize the vehicle during use of the unit, so that the bed of the vehicle will not bounce on its suspension assembly.

According to an aspect of the invention, the slide mechanism 20, 22, 26, 28 is dimensioned to space the upper surface of the table at substantially the standard height of a table above the surface below it, i.e. about thirty inches.

FIGS. 1 and 2 illustrate typical arrangements of shelving and vertical partitions within the cabinet 65, 70, 72. However, it is to be understood that details of this type are variables and for that reason the specific shelf and partition combinations which are illustrated will not be specifically described.

Also, the details (e.g. corner joints, etc.) of the actual construction of the various cabinets and the manner of their attachment to the base member 24 are variables. The cabinets may be constructed from plywood panels which are painted or left unpainted. Or, the material used for the cabinet walls can be covered by a suitable laminate e.g. the various laminate materials which have been made available for use as interior coverings in recreational vehicles.

Although a cabinet and table unit for recreational use has been illustrated and described, it is to be understood that the principles of the present invention can also be employed for constructing a cabinet and table or desk construction for use by workmen in the field. For example, the cabinets can be provided with shelves for receiving books and/or other paper work and the table may be used as a desk. Also, the principles may be used for providing a field workshop, wherein the cabinets are adapted for storing tools and the table is adapted to function as a workbench.

Accordingly, it is to be understood that the above presented description relating to the illustrated embodiment is provided for example purposes only and the scope of the invention is to be established by appropriate legal interpretations of the appended claims.

I claim:

1. A cabinet-table unit adapted for installation in a vehicle bed space with an exterior access opening and for sliding movement between a stowed position within said space and a use position in which the unit projects partway out of said space through said exterior access opening, comprising:

a base having first and second end portions;
slide means between said base and the bed of the vehicle, mounting said unit for sliding movement between its stowed position and use position;
a first cabinet mounted onto the first end portion of the base, said first cabinet having an access opening facing towards the second end portion of the base;
a second cabinet hinge connected to the first cabinet, for movement between a first position wherein it is positioned over the second end portion of the base, and a second position in which it is positioned laterally outwardly from the second end portion of the base, said second cabinet having an access opening which faces the same direction as the access opening of the first cabinet when the second cabinet is in its second position;
a third cabinet which is also hinge connected to the first cabinet, for movement between a first position wherein it is positioned over the second end portion of the base, and a second position in which it is positioned laterally outwardly from the second end portion of the base, said third cabinet having an access opening which, when the third cabinet is in its second position, faces in the same direction as the access opening of the first cabinet; and
an inner cabinet mounted onto the first end portion of the base, endwise of the first cabinet in the direction opposite the second end portion of the base, said inner cabinet having a side access opening;

wherein the access openings of the second and third cabinets face each other when the second and third cabinets are in their first positions;

wherein, when the unit is in its stowed position, the second and third cabinets are in their first positions; and when the unit is in its use position, the second end portion of the base and the second and third cabinets are located outside of the bed space of the vehicle, the second and third cabinets are in their second positions, and the access openings of the first, second, and third cabinets face outwardly of the bed space;

wherein the slide means is offset laterally from the center of the exterior access opening of the bed space to offset the unit and provide access to said side access opening through said exterior access opening when the unit is in its use position by moving the second cabinet into its first position; and wherein the second end portion of the base functions as a table when the unit is in its use position.

2. A unit according to claim 1, further including releasable lock means for locking said second and third cabinets into their second positions.

3. A unit according to claim 1, wherein the slide means comprises:

first and second rail means secured to the bed of the vehicle and the base of the unit, respectively, said first and second rail means being aligned with each other and cooperating to mount the unit; and first and second caster means arranged to ride on said first and second rail means, respectively, for sliding movement of the unit between its stowed and use positions.

4. A unit according to claim 3, wherein the slide means further comprises positioning means for properly positioning the unit when the unit has slid outwardly to its use position, said positioning means including cutouts in one of the rail means for receiving the caster means that rise on said one rail means.

5. A unit according to claim 3, wherein:

the second caster means is secured to the bed of the vehicle endwise outwardly of the first rail means; and when the unit is moved into its stowed position, the second rail means moves off of the second caster means and outward portions of the first and second rail means make frictional contact, inhibiting outward movement of the unit toward its use position.

6. A unit according to claim 3, wherein the first and second rail means are dimensioned to space the table at a substantially standard height for tables.

7. A unit according to claim 1, further including a support leg means for said table having a first end which when in use in connected to the second end portion of the base, and a free second end.

8. A unit according to claim 7, wherein said support leg means is movable between a storage position up flat against the underside of the base down into an operable position in which it projects generally downwardly from the base.

* * * * *